US006398288B1

(12) United States Patent
Yuge

(10) Patent No.: US 6,398,288 B1
(45) Date of Patent: Jun. 4, 2002

(54) CONTROL DEVICE OF AUTOMOTIVE PIVOTING DOOR

(75) Inventor: Masaaki Yuge, Yokohama (JP)

(73) Assignee: Ohi Seisakusho Co., Ltd., Yokohama (JP)

(*) Notice: Subject to any disclaimer, the term of this patent is extended or adjusted under 35 U.S.C. 154(b) by 0 days.

(21) Appl. No.: 09/664,378

(22) Filed: Sep. 18, 2000

(30) Foreign Application Priority Data

Oct. 29, 1999 (JP) .......................................... 11-310367
Oct. 29, 1999 (JP) .......................................... 11-310368
Oct. 29, 1999 (JP) .......................................... 11-310369

(51) Int. Cl.[7] .................................................. B60J 5/00
(52) U.S. Cl. ...................................... 296/146.4; 49/341
(58) Field of Search ............................ 49/25, 28, 139, 49/140, 339, 340, 341; 296/146.4, 146.8, 56, 106

(56) References Cited

U.S. PATENT DOCUMENTS 5,563,483 A * 10/1996 Kowall et al. ................. 49/26
5,851,049 A * 12/1998 Squire et al. ............ 296/146.4
5,851,050 A * 12/1998 Squire et al. ............ 296/146.4
5,896,703 A * 4/1999 Wright et al. ................. 49/339
5,982,126 A * 11/1999 Hellinga et al. ............... 49/28
6,170,196 B1 * 1/2001 Kato ....................... 296/146.8
6,270,147 B1 * 8/2001 Butler et al. ............. 296/146.4

FOREIGN PATENT DOCUMENTS

JP 1314620 * 12/1989 .............. 296/146.6
JP 6-71852 10/1994

* cited by examiner

*Primary Examiner*—Jerry Redman
(74) *Attorney, Agent, or Firm*—Foley & Lardner

(57) ABSTRACT

A motor vehicle has a pivoting door that pivots upward and downward. A control device for controlling the pivoting door comprises an electric drive unit that drives the pivoting door by an electric power; a door operation switch that permits the pivoting door to pivot between a full-close position and a full-open position with the aid of the electric drive unit when operated; a movement stopping structure that stops and holds the pivoting door at a half-open position when operated; and a control unit that controls the electric drive unit and the movement stopping structure in accordance with an ON/OFF operation of the door operation switch.

19 Claims, 8 Drawing Sheets

CONTROL DEVICE OF AUTOMOTIVE PIVOTING DOOR

BACKGROUND OF THE INVENTION

1. Field of the Invention

The present invention relates in general to control devices of automotive doors, and more particularly to control devices for controlling movement of an automotive pivoting door, such as a vertically pivoting back door or the like.

2. Description of the Prior Art

Usually, wagon type motor vehicles and the like are equipped with openable back doors for facilitating loading and unloading work. Some of such doors are of a vertically pivoting type that pivots upward and downward about a rear end of a vehicle roof. However, due to inherent construction, during its pivoting, the rear end of the door becomes largely projected rearward. Thus, if the vehicle is parked in a limited area where only a small space is left behind the vehicle, the back door can not be fully opened. In this case, the work for loading and unloading has to be made with the door halfly opened. That is, the worker has to carry out the loading/unloading work awkwardly holding the door at such half-open position with his or her hand.

Japanese Utility Model Provisional Publication 6-71852 shows a vertically pivoting door that is driven by an electric drive unit. However, even this door fails to be stopped at a desired half-open position.

SUMMARY OF THE INVENTION

It is therefore an object of the present invention to provide a control device of an automotive pivoting door, which can pivot the door between full-close and full-open positions by an electric power and can stop and hold the door at a desired half-open position by operating a door operating switch.

It is another object of the present invention to provide a control device of an automotive pivoting door, which can pivot the door upward or downward by an electric power once the door is manually pivoted upward or downward by a predetermined small angle.

According to the present invention, there is provided a control device for use in a motor vehicle having a pivoting door that pivots upward and downward. The control device comprises an electric drive unit for pivoting the pivoting door by an electric power; a door operation switch that permits the pivoting door to pivot between a full-close position and a full-open position with the aid of the electric drive unit when operated; a movement stopping means that stops and holds the pivoting door at a half-open position when operated; and a control unit for controlling said electric drive unit and the movement stopping means in accordance with an ON/OFF operation of the door operation switch.

DETAILED DESCRIPTION OF THE DRAWINGS

Other objects and advantages of the present invention will become apparent from the following description when taken in conjunction with the companying drawings, in which.

DETAILED DESCRIPTION OF THE EMBODIMENTS

In the following, two embodiments of the present invention will be described in detail with reference to the accompanying drawings.

For ease of understanding, various directional terms, such as, front, rear, right, left, upward, downward and the like are used in the following description. However, such terms should be understood with respect to a drawing or drawings on which the corresponding part or parts are illustrated.

Figure 1:
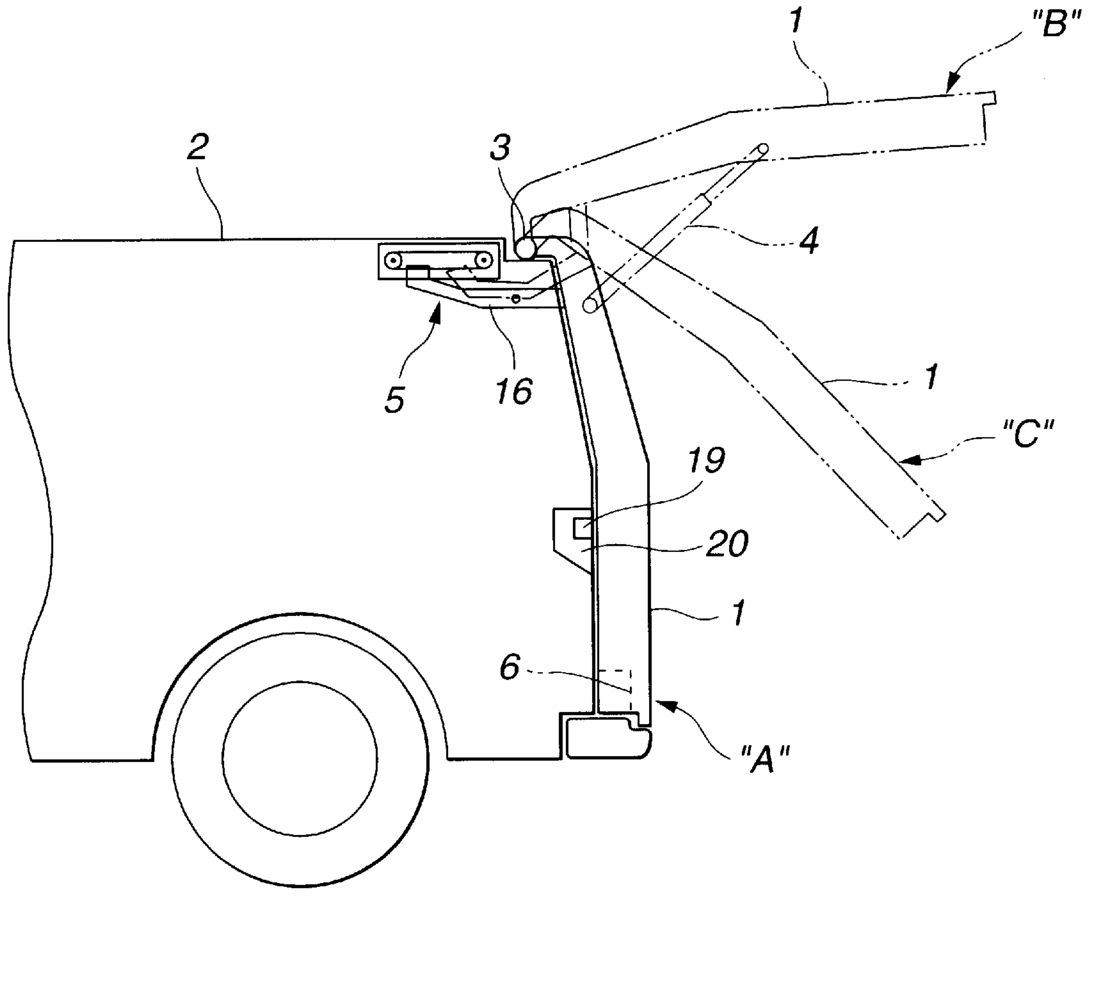
FIG. 1 is a side rear view of a motor vehicle that has a vertically pivoting back door controlled by the control device of the present invention.

Referring to FIG. 1, there is shown a rear portion of a motor vehicle, that has a vertically pivoting back door 1 controlled by a control device of the present invention. That is, the door 1 is pivotally connected at its upper end to a rear end of a roof 2 through a hinge shaft 3. Thus, the door 1 can pivot upward to a full-open position "B" and downward to a full-close position "A". A pair of gas stays 4 are each provided between the door 1 and the rear end of the vehicle to bias the door 1 toward the full-open position "B". The gas stays 4 can be telescopically contracted when the door 1 is pivoted down toward the full-close position "A".

Designated by numeral 5 is an electric drive unit that is mounted beneath the roof 2 and connected to the door 1 through an after-mentioned opening/closing mechanism 10. That is, when one of switches 19*a* and 19*b* (see FIG. 4) of a door operation switch unit 19 is manipulated, the drive unit 5 is energized to drive the door 1 to pivot in opening or closing direction.

Although not shown in the drawing, the door 1 is equipped at its lower end with a door lock and the vehicle is equipped at its lower rear end with a striker. That is, when the door 1 is pivoted down to the full-close position "A", the door lock becomes engaged with the striker to establish a latched condition of the door 1 relative to the vehicle body. A lock system 6 is incorporated with the door lock and the striker, which comprises an electric latch cancellor and an electric door closure. That is, when energized, the electric latch chancellor cancels the latched condition between the door lock and the striker, and when, due to closing movement of the door 1, the door lock is brought to a so-called half-latch position wherein the door lock incompletely or halfly engaged with the striker, the electric door closure becomes energized to enforcedly pull the door 1 to the full-close and latched position.

Figure 2:
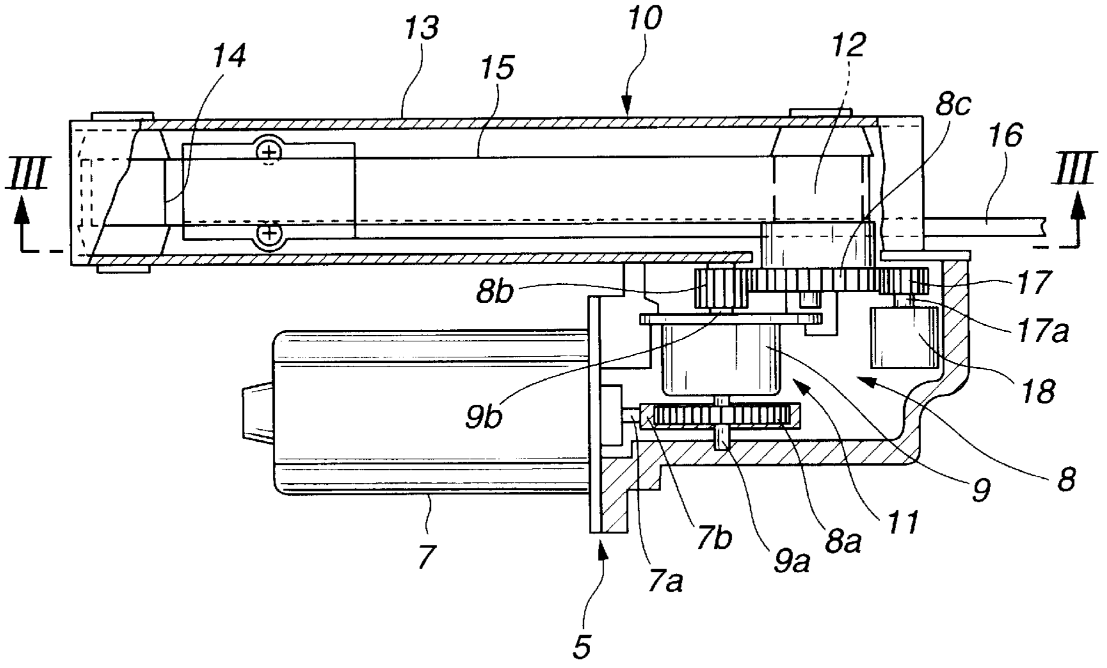
FIG. 2 is a partially cut plan view of an electric drive unit for driving the back door.
Figure 3:
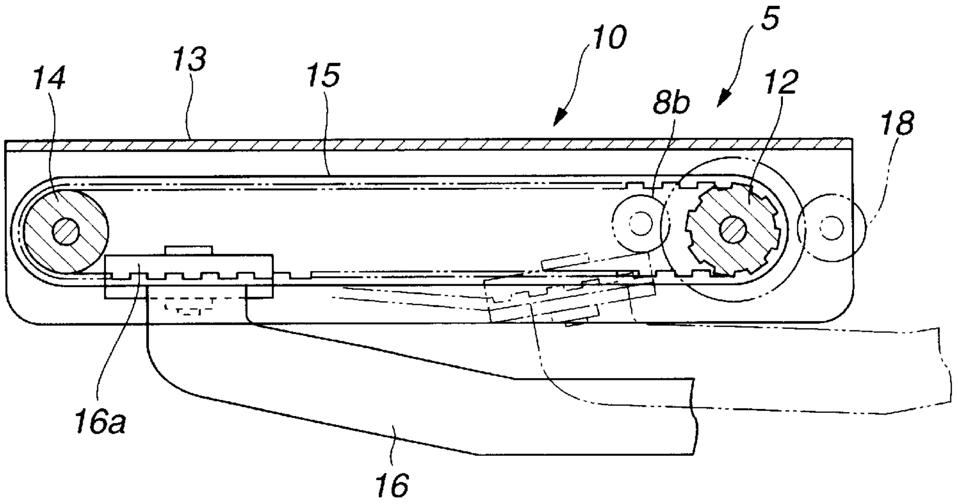
FIG. 3 is a sectional view taken along the line of III—III of FIG. 2.

As shown in FIGS. 2 and 3, the drive unit 5 comprises a reversible electric motor 7 that produces a power when electrically energized, a speed reduction gear 8 that transmits the power of the motor 7 to a power output part thereof while reducing the rotation speed, an opening/closing mechanism 10 that forces to the door 1 to pivot in opening or closing direction by receiving the power from the power output part, and an electric clutch 9 that is disposed in a power transmission path that extends from an output shaft 7*a* of the motor 7 to the opening/closing mechanism 10 to selectively establish and break the path.

The speed reduction gear 8 comprises a worm wheel 8*a* that is meshed with a worm 7*b* on the output shaft 7*a* of the motor 7 and tightly disposed on an input shaft 9*a* of the clutch 9, a pinion 8*b* that is tightly disposed on an output shaft 9*b* of the clutch 9, and a larger diameter gear 8*c* that is meshed with the pinion 8*b*.

When the motor 7 is stopped and the clutch 9 assumes its engaged condition, the power transmission path from the opening/closing mechanism 10 to the output shaft 7*a* of the motor 7 through the clutch 9 constitute a movement stopping means 11 that can stop and hold the door 1 at a desired intermediate position "C" between the full-close position "A" and the full-open position "B". However, if desired, in place of this movement stopping means 11, or together with this means 11, a known brake mechanism 28 (see FIG. 4) that brakes movement of after-mentioned pulleys 12 and 14 may be used.

The clutch 9 is of a normally OFF type that assumes its OFF condition when de-energized. That is, normally, the clutch 9 breaks the power transmission path that extends from the motor 7 to the opening/closing mechanism 10. While, when energized, the clutch 9 establishes the power transmission path to transmit the rotation of the motor 7 to the opening/closing mechanism 10.

The opening/closing mechanism 10 comprises a base plate 13 that is fixed to the vehicle body and extends in fore-and-aft direction, a drive pulley 12 that is rotatably held on a rear end of the base plate 13 and has the larger diameter gear 8*c* concentrically and integrally connected thereto, a driven pulley 14 that is rotatably held on a front end of the base plate 13 and an endless belt 15 that is put on the drive and driven pulleys 12 and 14. Preferably, the endless belt 15 is a timing belt having on its inner surface teeth that are meshed with teeth of the drive and driven pulleys 12 and 14.

As is seen from FIG. 3, a lower part of the endless belt 15 has a link 16 connected thereto through a connector 16*a*. The link 16 extends rearward, that is, toward the door 1. As is understood from FIG. 1, the rear end of the link 16 is pivotally connected to an upper portion of the door 1. That is, as is seen from FIG. 3, due to forward and rearward movement of the belt 15, the link 16 is linearly movable between a left or close position as shown by a solid line and a right or open position as shown by a phantom line. That is, when the link 16 assumes the close position, the door 1 is fully closed, while when the link 16 assumes the open position, the door 1 is fully opened.

When, with the door 1 assuming the full-close position "A", the motor 7 and the clutch 9 are energized and the motor 7 rotates in a normal direction, the rotation of the motor 7 is transmitted through the speed reduction gear 8, the clutch 9 and the drive pulley 12 to the belt 15 to rotate the same in a counterclockwise direction in FIG. 3 around the drive and driven pulleys 12 and 14. Due to this rotation of the belt 15, the link 16 is moved rightward from the close position toward the open position. With this rightward movement of the link 16, the pivoting door 1 is pushed rearward and thus the door 1 is pivoted upward toward the full-open position "B".

While, when, with the door 1 assuming the full-open position "B", the motor 7 and the clutch 9 are energized and the motor 7 rotates in a reversed direction, the rotation of the motor 7 rotates the belt 15 in a clockwise direction in FIG. 3. Due to this rotation of the belt 15, the link 16 is moved leftward from the open position toward the close position. With this leftward movement of the link 16, the pivoting door 1 is pulled forward and thus the door 1 is pivoted downward toward the full-close position "A".

When, with the door 1 being moved upward or downward, the movement stopping means 11 is operated, the motor 7 is stopped and the clutch 9 is energized. With this, the door 1 is stopped and held at a desired intermediate or half-open position "C" against the biasing force of the gas stays 4 and the self weight of the door 1.

It is to be noted that when the clutch 9 assumes its OFF or disengaged condition breaking the power transmission path, the door 1 can be easily pivoted manually with a light force.

As is seen from FIGS. 2 and 3, to the larger diameter gear 8*c*, there is meshed a smaller diameter gear 17. The gear 17 has a shaft 17*a* incorporated with a door sensor 18. That is, by analyzing rotation of the shaft 17*a*, the door sensor 18 detects a position of the door 1, a moved distance of the door 1 from the position and the moving direction of the door 1. As the door sensor 18, a rotary encoder type is suitable, which issues two double phase pulses whose phases are different by 90 degrees.

Figure 4:
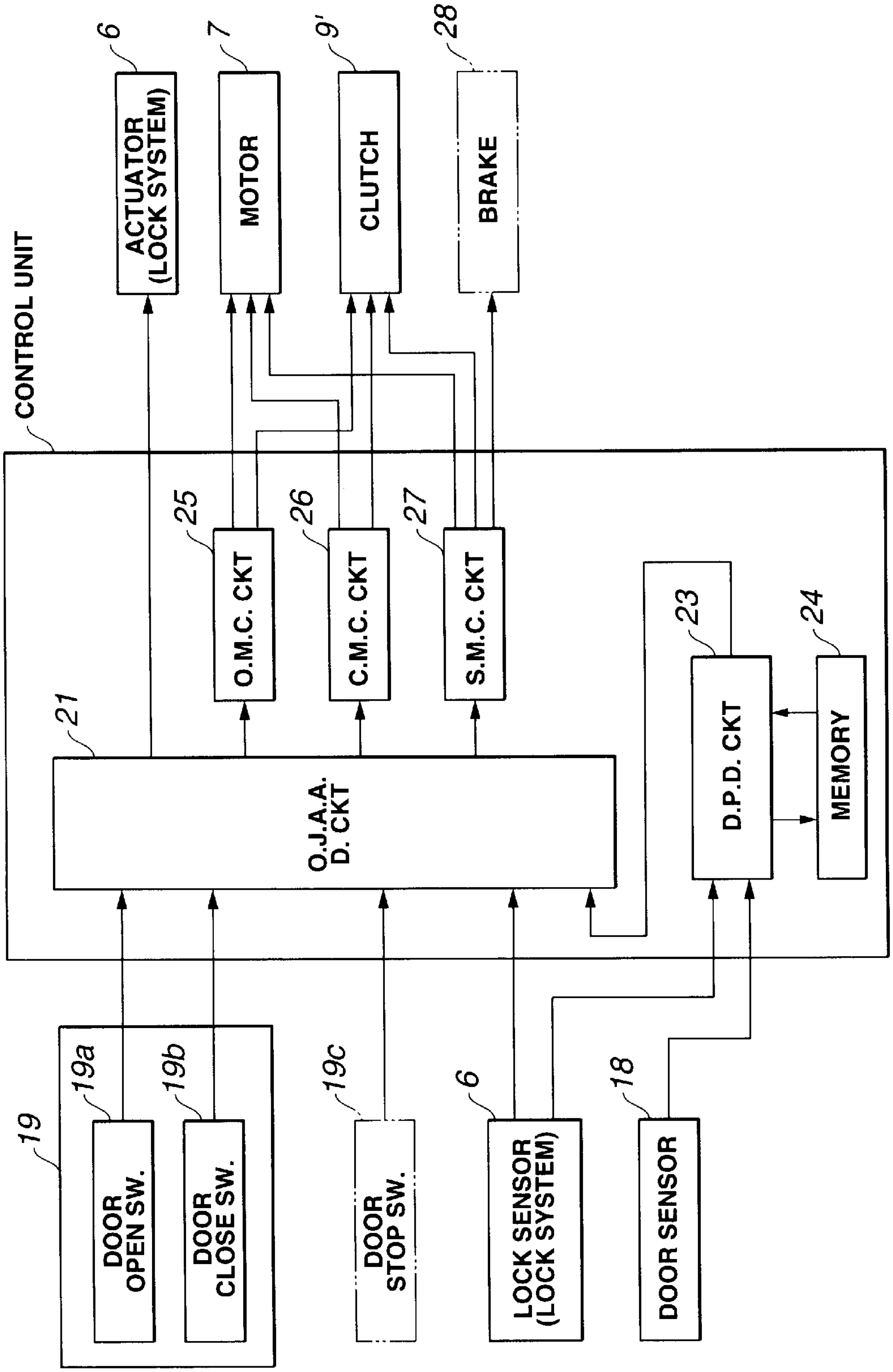
FIG. 4 is a block diagram of an electric circuit employed in a first embodiment of the present invention.

FIG. 4 shows a block diagram of an electric circuit employed in a first embodiment of the present invention.

In the drawing, denoted by numeral 19 is a door operation switch unit which is mounted on a rear combination lamp 20 (see FIG. 7) of the vehicle. The door operation switch unit 19 comprises a door open switch 19*a* and a door close switch 19*b*. As will become apparent as the description proceeds, the door operation switch unit 19 also serves as a door stop switch.

Information signals from the switches 19*a* and 19*b* are led to an operation judgment and actuation determination circuit 21 of a control unit CU. It is to be noted that this control unit CU is constructed of a microcomputer that comprises a central processing unit (CPU), a random access memory (RAM), a read only memory (ROM) and input and output interfaces.

Thus, by analyzing the information signals, the circuit 21 judges the operation of the switches 19*a* and 19*b*, and based on the judgment, the circuit 21 decides an actuation manner that the motor 7 and the clutch 9 should take.

Figure 7:
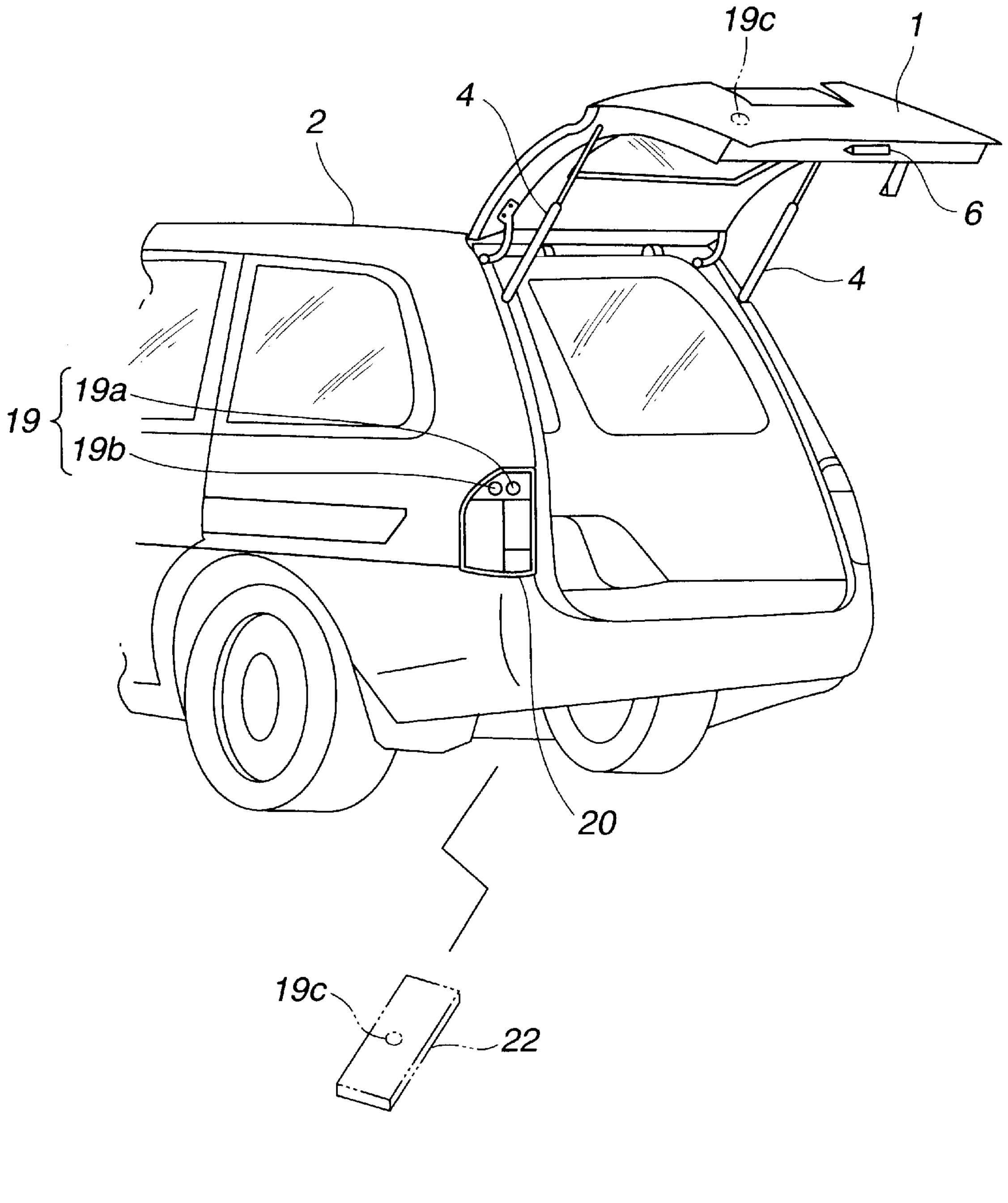
FIG. 7 is a perspective view of a rear portion of the motor vehicle, showing the vertically pivoting back door fully opened.

If desired, as is indicated by a phantom line, a door stop switch 19*c* may be included in the door operation switch unit 19, that is designed to stop the pivoting movement of the door 1 when operated. Furthermore, if desired, as is seen in FIG. 7, such switch 19*c* may be mounted on a free end portion of the door 1 or included in a remote controller 22 . As is seen in FIG. 4, information signals from the door stop switch 19*c* are led to the operation judgment and actuation determination circuit 21.

The lock system 6 includes a lock/unlock detecting means or lock sensor (not shown) which issues a locking signal when the door lock is locked and an unlocking signal when the door lock is unlocked. These signals are led to the operation judgment and actuation determination circuit 21 and to an after-mentioned door position detecting circuit 23.

Information signals from the door sensor 18 are led to the door position detecting circuit 23. The information signals from the door sensor 18 are of a pulse type.

That is, when the door 1 is in the full-close position "A" and the door 1 is locked, that is, when a locking signal is issued from the lock system 6, the number of pulses of the signal from the door sensor 18 is set as an initial value in the door position detecting circuit 23, and when the door 1 is pivotally moved from the full-close position "A" toward the full-open position "B", the pulses issued from the door sensor 18 are continuously counted in the circuit 23 to produce a door position signal that represents the position of the door 1. The door position signal is led to the operation judgment and actuation determination circuit 21. Thus, when the door 1 is pivoted down toward the full-close position "A", the number of the pulses is reduced.

In a memory 24, there is memorized the number of pulses that is to be counted when the door 1 is pivoted from the full-close position "A" to the full-open position "B". In the memory 24, other needed information is also memorized. Thus, when the number of pulses counted by the door position detecting circuit 23 becomes in coincidence with the number that is memorized in the memory 24 as representing the full-open position "B", it is determined that the door 1 has reached the full-open position "B".

In the first embodiment, the control unit "CU" operates as follows.

(I) In case wherein a locking signal is issued from the lock sensor of the lock system 6 and the door open switch 19*a* is turned ON once.

In this case, the operation judgment and actuation determination circuit 21 operates the actuator of the lock system 6 to cancel the locked condition of the door lock. Upon this, an unlocking signal is issued from the lock sensor of the lock system 6 and led into the circuit 21. With this, the circuit 21 operates an opening movement control circuit 25. When the door position detecting circuit 23 issues a signal representing that the door 1 has reached the full-open position "B", the operation judgment and actuation determination circuit 21 stops the operation of the opening movement control circuit 25. When operated, the opening movement control circuit 25 causes the clutch 9 to assume the engaged condition and causes the motor 7 to run in a normal direction. Accordingly, the door 1 is pivoted in an opening direction by the drive unit 5.

(II) In case wherein an unlocking signal is issued from the lock system 6, the door position detecting circuit 23 issues a signal representing that the door 1 is in the full-open position "B" and the door close switch 19*b* is turned ON once.

In this case, the operation judgment and actuation determination circuit 21 operates a closing movement control circuit 26. When the door position detecting circuit 23 issues a signal representing that the door 1 has reached the full-close position "A", the circuit 21 stops the operation of the circuit 26. When operated, the closing movement control circuit 26 causes the clutch 9 to assume the engaged condition and causes the motor 7 to run in a reversed direction. Accordingly, the door is pivoted in a closing direction by the drive unit 5.

(III) In case wherein the opening movement control circuit 25 is kept operated due to the above-mentioned single closing operation of the door open switch 19*a* or the closing movement control circuit 26 is kept operated due to the above-mentioned signal closing operation of the door close switch 19*b*, and one of the door open switch 19*a*, the door close switch 19*b* and the door stop switch 19*c* is turned ON once.

In this case, the operation judgement and actuation determination circuit 21 stops the operation of the circuit 25 or the circuit 26 and simultaneously operates a stopping movement control circuit 27. When thereafter one of the door open switch 19*a* and the door close switch 19*b* is turned ON, the circuit 21 stops the operation of the stopping movement control circuit 27. When operated, the stopping movement control circuit 27 causes the clutch 9 to assume the engaged condition and causes the motor 7 to stop. If, as the movement stopping means 11, the above-mentioned known brake mechanism 28 is employed, the circuit 27 operates also the brake mechanism 28 upon operation.

Under this condition, the power transmission path of the drive unit 5 serves as the movement stopping means 11, and thus, the door 1 is stopped and held at a desired intermediate or half-open position against the self weight of the door 1 and the biasing force of the gas stays 4.

(IV) In case wherein an unlocking signal is kept issued from the lock system 6, the door position detecting circuit 23 issues a signal representing that the door 1 is taking a position between the full-close position "A" and the full-open position "B" and the door open switch 19*a* is turned ON once.

When, in this case, the clutch 9 is in the engaged condition, the operation judgement and actuation determination circuit 21 judges that the door 1 has been in an intermediate or half-open position and operates the opening movement control circuit 25. With this, the motor 7 is operated to run in a normal direction while keeping the engaged condition of the clutch 9. Thus, the door 1 is pivotally moved in the opening direction.

While, when, in the above-mentioned case, the clutch 9 is in the disengaged condition, the circuit 21 judges that the door 1 is being manually controlled and operates the stopping movement control circuit 27. With this, the clutch 9 is brought to the engaged condition.

(V) In case wherein an unlocking signal is issued from the lock sensor of the lock system 6, the door position detecting circuit 23 issues a signal representing that the door 1 is taking a position between the full-close position "A" and the full-open position "B", and the door close switch 19*b* is turned ON once.

When, in this case, the clutch 9 is in the engaged condition, the operation judgement and actuation determination circuit 21 judges that the door 1 has been in an intermediate or half-open position and operates the opening movement control circuit 25. With this, the motor 7 is operated to run in a reversed direction while keeping the engaged condition of the clutch 9. Thus, the door 1 is pivotally moved in the closing direction.

While, when, in the above-mentioned case, the clutch 9 is in the disengaged condition, the circuit 21 judges that the door 1 is being manually controlled and operates the stopping movement control circuit 27. With this, the clutch 9 is brought to the engaged condition.

It is to be noted that the above-mentioned terminology for the circuits 21, 23, 25, 26 and 27 and the memory 24 has been provided just for ease of understanding the first embodiment of the invention. That is, actually, the microcomputer constituting the control unit CU is designed to carry out the above-mentioned functions of the circuits 21, 23, 25, 26 and 27 and the memory 24.

In the following, programmed operation steps carried out by the control unit CU (viz., microcomputer) employed in the first embodiment will be described with reference to the flowcharts of FIGS. 5 and 6.

Figure 5:
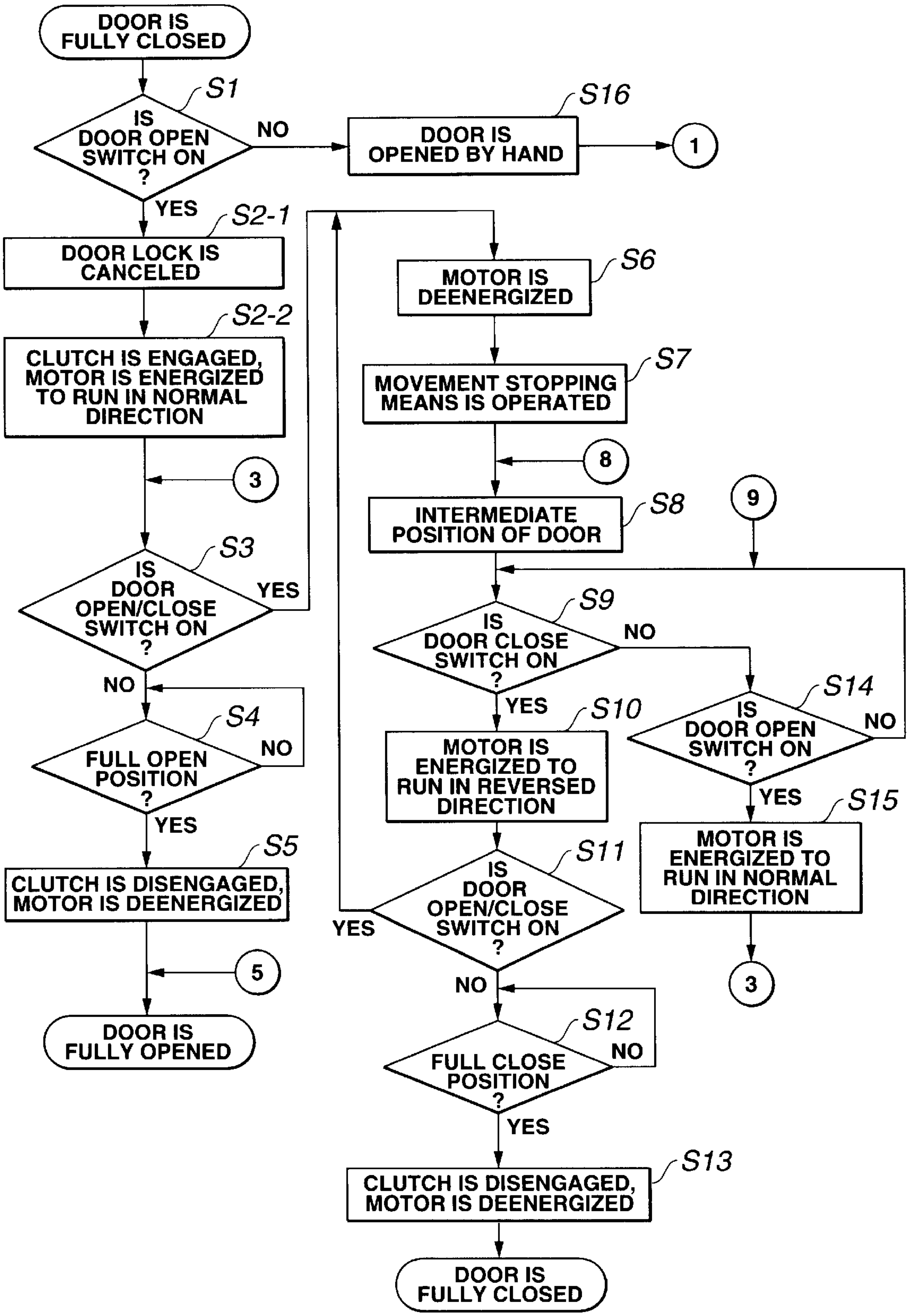
FIG. 5 is a flowchart showing operation steps of a main routine, that are executed by a control unit employed in the first embodiment of the present invention.

In FIG. 5, at step S1, when the door 1 is in the full-close position "A", judgment is carried out as to whether the door open switch 19*a* of the door operation switch unit 19 is turned ON or not. If YES, that is, when the switch 19*a* is turned ON, the operation flow goes to step S2-1. At this step S2-1, the engagement between the door lock and the striker is canceled. Then, the operation flow goes to step S2-2, at this step S2-2, the clutch 9 is engaged and the motor 7 is energized to run in a normal direction. Thus, by the drive unit 5, the door 1 starts to pivot upward from the full-close position "A". At step S3, that is, during the upward pivoting of the door 1, judgement is carried out as to whether either one of the door open switch 19*a* and door close switch 19*b* is turned ON or not. If NO, that is, when neither of the door open and close switches 19*a* and 19*b* is turned ON, the upward pivoting of the door 1 is continued and the operation flow goes to step S4. At this step S4, judgment is carried out as to whether the door 1 reaches the full-open position "B" or not. If YES, that is, when the door 1 reaches to the full-open position "B", the operation flow goes to step S5. At this step S5, the clutch 9 is disengaged and the motor 7 is de-energized. Thus, the door 1 is held in the full-open position "B" with the aid of the gas stays 4.

If YES at step S3, that is, when the door open switch 19*a* is turned ON again or the door close switch 19*b* is turned ON during the upward movement of the door 1, the operation flow goes to step S6. At this step S6, the motor 7 is de-energized keeping the engaged condition of the clutch 9, and at step S7, the movement stopping means 11 becomes operative. Thus, the door 1 is stopped at a half-open position, that is, at a desired intermediate position "C" (step S8). Under this condition, the door 1 keeps this half-open position without aid of the worker's hand. Thus, the worker can carry out the loading/unloading work with ease. It is thus to be noted that once the door open switch 19*a* or the door close switch 19*b* is turned ON during the upward pivoting of the door 1, the door 1 is instantly stopped and held at a desired intermediate position "C". That is, in this case, the door operation switch unit 19 serves as a door stopping switch.

At step S9, judgment is carried out as to whether the door close switch 19*b* of the door operation switch unit 19 is turned ON or not. If YES, that is, when the door close switch 19*b* is turned ON, the operation flow goes to step S10. At this step S10, the motor 7 is energized to run in a reversed direction. Thus, the door 7 starts to pivot downward toward the full-close position "A" from the intermediate position "C". Then, the operation flow goes to step S11. At this step S11, that is, during the downward pivoting of the door 1, judgment is carried out as to whether either one of the door open switch 19*a* and door close switch 19*b* is turned ON or not. If NO, that is, when neither of the door open and close switches 19*a* and 19*b* is turned ON, the downward pivoting of the door 1 is continued and the operation flow goes to step S12. At this step S12, judgment is carried out as to whether the door 1 reaches the full-close position "A" or not. If YES, that is, when the door 1 reaches the full-close position "A", the operation flow goes to step S13 to disengage the clutch 9 and stop the motor 7. Thus, the door 1 is held in the full-close position "A".

If YES at step S11, that is, when, during the downward pivoting of the door 1, one of the door open and close switches 19*a* and 19*b* is turned ON, the operation flow goes up to step S6. Thus, for the reason as has mentioned hereinabove, the door 1 is stopped and held at a new desired intermediate position "C". By operating the switch 19*a* or 19*b* during the downward pivoting of the door 1, fine adjustment of the door intermediate position "C" can be made.

If NO at step S9, that is, when the door close switch 19*b* is not turned ON, the operation flow goes to step S14. At this step S14, judgement is carried out as to whether the door open switch 19*a* of the door operation switch unit 19 is turned ON or not. If YES, that is, when the door open switch 19*a* is turned ON, the operation flow goes to step S15 to energize the motor 7 to run in a normal direction. Thus, the door 7 is starts to pivot upward toward the full-open position "B" from the intermediate position "C". Then, the operation flow goes back to step S3 to control the door 1 in the above-mentioned manner.

Figure 6:
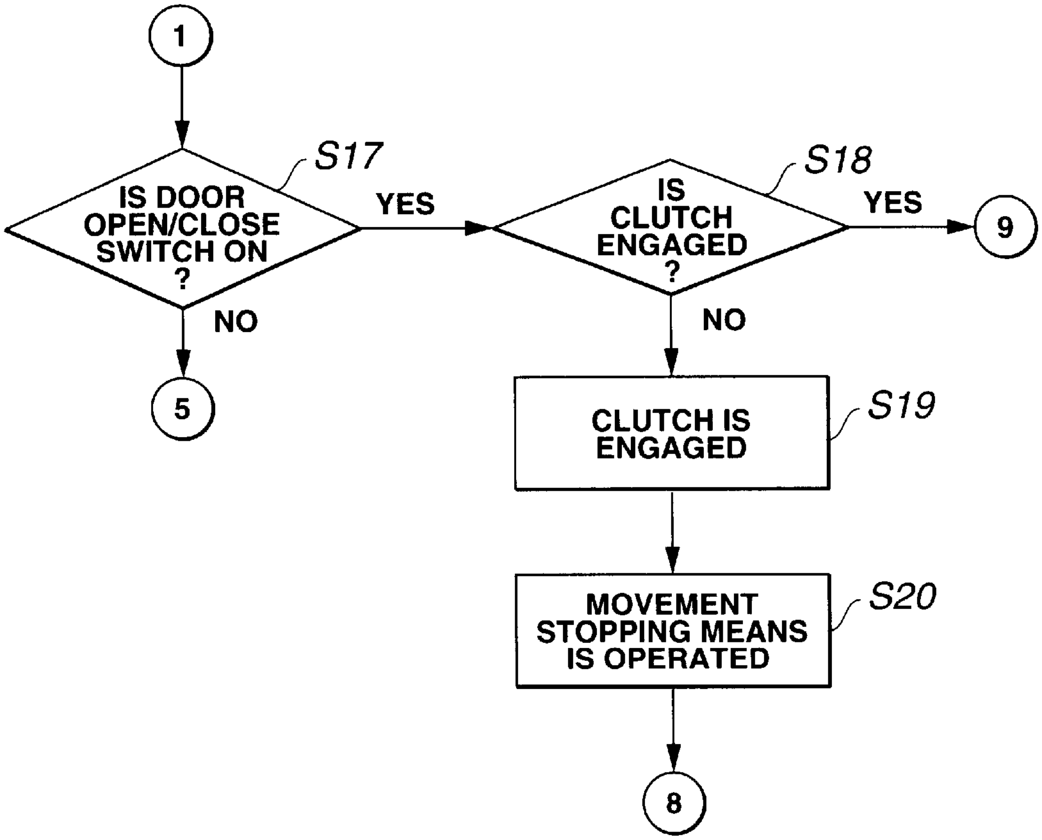
FIG. 6 is a flowchart showing operation steps of a sub-routine, that are executed by the control unit employed in the first embodiment.

If NO at step S1, that is, when, with the door 1 assuming the full-close position "A", the locked condition of the door lock is cancelled manually and the door 1 is pulled up to a desired half-open position by hand (S16), the operation flow goes to step S17 of the flowchart of FIG. 6. At this step S17, judgment is carried out as to whether either one of the door open and close switches 19*a* and 19*b* of the door operation switch unit 19 is turned ON or not. If NO, that is, when neither of the door open and close switches 19*a* and 19*b* is turned ON, further upward pivoting of the door 1 is permitted and thus the door 1 can be pivoted up to the full-open position "B" by hand.

If YES at step S17, that is, when one of the door open and close switches 19*a* and 19*b* is turned ON, the operation flow goes to step S18. At this step S18, judgement is carried out as to whether the clutch 9 is in its engaged condition or not. If YES, that is, when the clutch 9 is engaged, the operation flow goes to step S9 to control the door 1 in the above-mentioned manner.

While, if NO at step S18, that is, when the clutch 9 is not engaged, the operation flow goes to step S19. At this step S19, the clutch 9 is engaged to engage the power transmission path. Thus, the movement stopping means 11 (and 28) becomes operative (step S20). Thus, the desired half-open position "C" of the door 1 can be held without aid of the worker's hand. Then, the operation flow goes to step S8 to control the door 1 in the above-mentioned manner.

Figure 8:
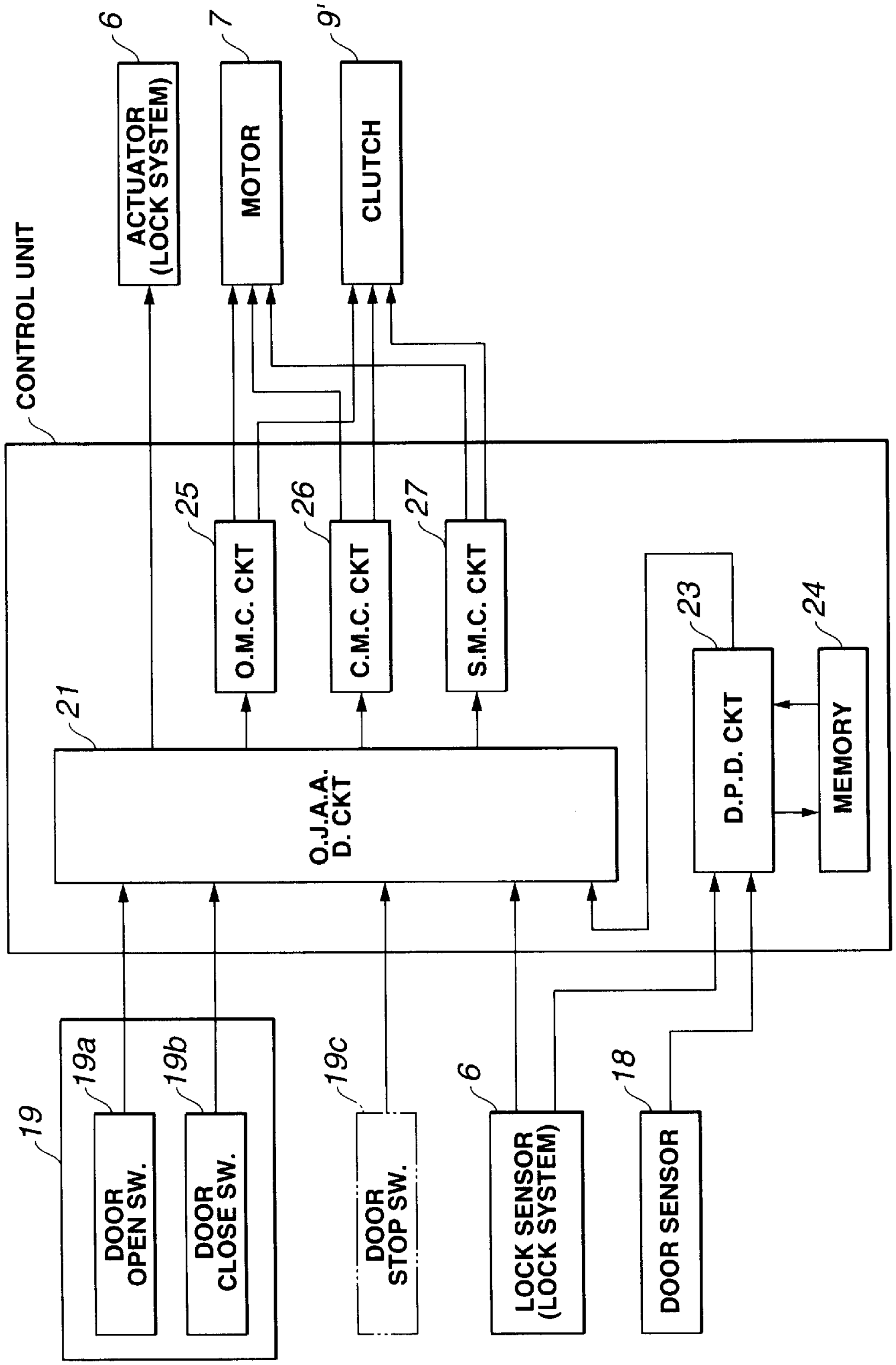
FIG. 8 is a block diagram of an electric circuit employed in a second embodiment of the present invention.

Referring to FIG. 8, there is shown a block diagram of an electric circuit employed in a second embodiment of the present invention.

Since the second embodiment is similar to the above-mentioned first embodiment, only portions that are different from those of the first embodiment will be described in the following.

In the second embodiment, a different electric clutch 9' is used in place of the above-mentioned clutch 9. That is, in addition to the above-mentioned engaged and disengaged conditions, the clutch 9' employed in the second embodiment has further a so-called half-engaged condition. By assuming this half-engaged condition, the clutch 9' can provide a manual pivoting movement of the door 1 with a suitable resistance.

When de-energized, the clutch 9' assumes the disengaged condition thereby to cut off the power transmission path from the motor 7 to the opening/closing mechanism 10. Under this condition, the power transmission from the motor 7 to the mechanism 10 is suppressed. When energized by a larger magnitude of electric power, the clutch 9' assumes the engaged condition thereby to establish the power transmission path. Thus, under this condition, the power transmission from the motor 7 to the mechanism 10 is completely carried out.

While, when energized by a smaller magnitude of electric power, the clutch 9' assumes the half-engaged condition. Under this condition, the power transmission path is incompletely provided, that is, engagement between the motor 7 and the mechanism 10 is incompletely made. That is, under this half-engaged condition of the clutch 9', the manual pivoting movement of the door 1 can be carried out against a suitable braking force.

When the motor 7 is stopped and the clutch 9' assumes the half-engaged condition, the power transmission path from the opening/closing mechanism 10 to the output shaft 7*a* of the motor through the clutch 9' constitute a movement stopping means 11 that can stop and hold the door 1 at a desired intermediate or half-open position "C" between the full-close position "A" and the fully-open position "B".

When operated, the movement stopping means 11 produces a braking force that stops and holds the door 1 at a desired half-open position against the self weight of the door 1 and the biasing force of the gas stays 4. The braking force can be adjusted by changing the magnitude of the electric power.

Since the operation judgment and actuating determination circuit 21 of the second embodiment operates similar to the above-mentioned circuit 21 of the above-mentioned first embodiment of FIG. 4, only different functions will be described in the following for ease of description.

That is, in the above-mentioned case (III) of the first embodiment, when the stopping movement control circuit 27 is operated, the circuit 27 causes the clutch 9 to assume the engaged condition and causes the motor 7 to stop.

However, in the second embodiment, when operated, the circuit 27 causes the clutch 9' to assume the half-engaged condition and causes the motor 7 to stop. Thus, like in the first embodiment, under such condition, the power transmission path of the drive unit 5 can serve as the movement stopping means 11, and thus, the door 1 can be stopped and held at a desired intermediate or half-open position against the self weight of the door 1 and the biasing force of the gas stays 4.

However, in the second embodiment, due to the half-engaged condition possessed by the clutch 9', the door 1 can be manually pivoted upward or downward from the intermediate position against the braking force produced by the halfly engaged clutch 9'.

In the second embodiment, in place of the above-mentioned cases (IV) and (V) of the first embodiment, the following case (IV') is provided.

(IV') In case wherein the stopping movement control circuit 27 is under operation and the door position detecting circuit 23 detects through the door sensor 18 that the door 1 has pivoted upward or downward by a predetermined angle.

When, in this case, the detected door pivoting is a pivoting for opening the door 1, the opening movement control circuit 25 is operated. With this, the door 1 is pivoted in the opening direction by the drive unit 5.

While, when the detected door pivoting is a pivoting for closing the door 1, the closing movement control circuit 26 is operated. With this, the door 1 is pivoted in the closing direction by the drive unit 5.

In the following, programmed operation steps carried out by the control unit CU (viz., microcomputer) employed in the second embodiment will be described with reference to the flowchart of FIG. 9.

Figure 9:
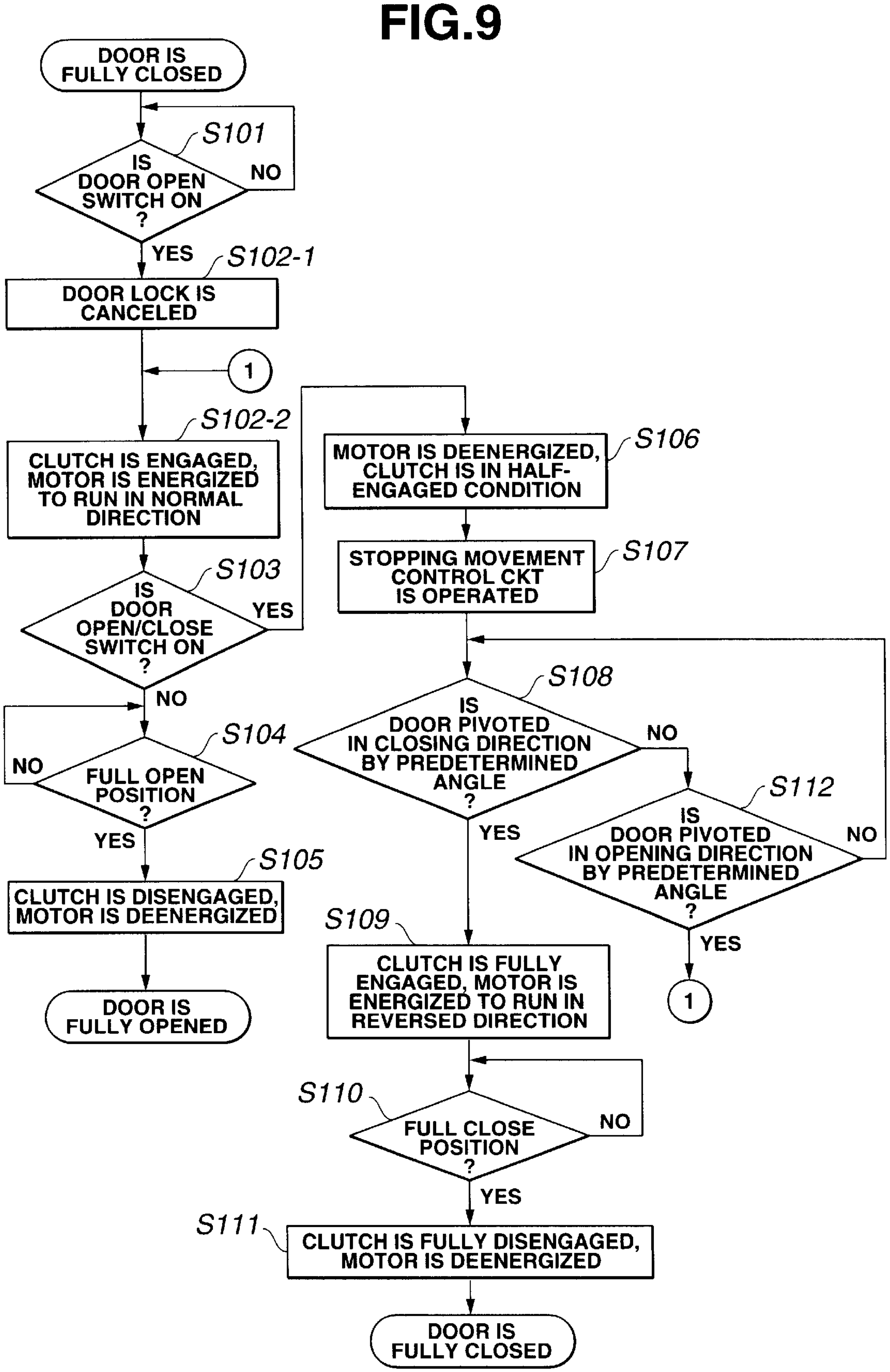
FIG. 9 is a flowchart showing operation steps that are executed by a control unit employed in the second embodiment of the present invention.

In FIG. 9, at step S1, when the door 1 is in the full-close position "A", judgment is carried out as to whether the door open switch 19*a* is turned ON or not. If YES, that is, when the switch 19*a* is turned ON, the operation flow goes to step S102-1. At this step S102-1, the engagement between the door lock and the striker is canceled. Then, the operation flow goes to step S102-2, at this step, the clutch 9' is fully engaged and the motor 7 is energized to run in a normal direction. Thus, by the drive unit 5, the door 1 starts to pivot upward from the full-close position "A". At step S103, that is, during the upward pivoting of the door 1, judgement is carried out as to whether either one of the door open switch 19*a* and door close switch 19*b* is turned ON or not. If NO, that is, when neither of the door open and close switches 19*a* and 19*b* is turned ON, the upward pivoting of the door 1 is continued and the operation flow goes to step S104. At this step S104, judgment is carried out as to whether the door 1 reaches the full-open position "B" or not. If YES, that is, when the door 1 reaches to the full-open position "B", the operation flow goes to step S105. At this step S105, the clutch 9 is fully disengaged and the motor 7 is de-energized. Thus, the door 1 is held in the full-open position "B" with the aid of the gas stays 4.

If YES at step S103, that is, when the door open switch 19*a* is turned ON again or the door close switch 19*b* is turned ON during the upward movement of the door 1, the operation flow goes to step S106. At this step S106, the motor 7 is stopped and the clutch 9' is brought to the half-engaged condition and at step S107, the stopping movement control circuit 27 is operated. Thus, the door 1 is stopped and held at a desired intermediate position "C". Thus, the worker can carry out the loading/unloading work with ease.

At step S108, judgment is carried out as to whether or not the door 1 is pivoted in a closing direction by a predetermined angle. If YES, that is, when the door 1 is pivoted in the closing direction by the angle, the operation flow goes to step S109. At this step S109, the clutch 9' is fully engaged and the motor 7 is energized to run in a reversed direction. With this, the door 1 is pivoted in the closing direction by the drive unit 5. Then, the operation flow goes to step S110. At this step S110, judgment is carried out as to whether the door 1 reaches the full-close position "A" or not. If YES, that is, when the door 1 reaches the full-close position "A", the operation flow goes to step S111 to fully disengage the clutch 9' and stop the motor 7. Thus, the door 1 is held in the full-close position "A".

If NO at step S108, that is, when the door 1 is not pivoted in the closing direction by the predetermined angle, the operation flow goes to step S112. At this step, judgment is carried out as to whether or not the door 1 is pivoted in an opening direction by a predetermined angle. If YES, that is, when the door 1 is pivoted in the opening direction by the angle, the operation flow goes back to step S102 to control the door 1 in the above-mentioned manner.

In the following, modifications of the present invention will be described.

In the above-mentioned second embodiment, the movement stopping means 11 is provided by bringing the clutch 9' into the half-engaged condition. However, if desired, the following modification may be used in place of such measure. That is, the speed reduction gear 8 is constructed to have a smaller speed reduction ratio. When, with this gear, the door 1 is applied with a certain force in opening or closing direction, the force induces a rotation of the motor 7 through the fully engaged clutch 9 and the speed reduction gear 8. The rotation of the motor 7 through the speed reduction gear 8 produces a certain resistance against the pivoting movement of the door 1. In this case, the clutch 9 may be removed. That is, the motor 7 is constantly engaged with the door 1 through the speed reduction gear 8.

In the above-mentioned first and second embodiments, two switches, that is, the door open and close switches 19*a* and 19*b* are used for opening and closing the door 1 respectively. However, if desired, in place of using the two switches 19*a* and 19*b*, a single switch serving both as the switches 19*a* and 19*b* may be used. In this case, the control unit CU is so arranged that when, with the door 1 assuming the full-close position "A", the switch is turned ON, the door 1 is pivoted in an opening direction by the drive unit 5, and when, with the door 1 assuming the full-open position "B", the switch is turned ON, the door 1 is pivoted in a closing direction.

The entire contents of Japanese Patent Applications 11-310367 (filed Oct. 29, 1999), 11-310368 (filed Oct. 29, 1999) and 11-310369 (filed Oct. 29, 1999) are incorporated herein by reference.

Although the invention has been described above with reference to the two embodiments of the invention, the invention is not limited to such embodiments as described above. Various modifications and variations of such embodiments may be carried out by those skilled in the art, in light of the above descriptions.

What is claimed is:

1. In a motor vehicle having a pivoting door that pivots upward and downward, a control device for controlling said pivoting door, comprising:

an electric drive unit for pivoting said pivoting door by an electric power;

a door operation switch that permits the pivoting door to pivot between a full-close position and a full-open position with the aid of said electric drive unit when operated;

a movement stopping means that stops and holds the pivoting door at a half-open position when operated; and a control unit for controlling said electric drive unit and said movement stopping means in accordance with an ON/OFF operation of said door operation switch;

in which said electric drive unit comprises:

a reversible electric motor;

a speed reduction gear having an input part connected to an output part of said motor;

an opening/closing mechanism that converts a power of the output part of said speed reduction gear to the pivoting movement of the pivoting door; and an electric clutch operatively disposed in a power transmission path that extends from said motor to said opening/closing mechanism, said electric clutch having both an engaged condition wherein said power transmission path is established and a disengaged condition wherein said power transmission path is broken;

in which said power transmission path constitutes said movement stopping means when said electric motor is de-energized and said electric clutch assumes said engaged condition.

2. A control device as claimed in claim 1, in which said control unit is constructed to control said electric drive unit and said movement stopping means in accordance with the number of times said door operation switch is manually operated in a given period.

3. A control device as claimed in claim 1, in which said movement stopping means is arranged to produce a braking force when said pivoting door is pivoted manually, said braking force being sufficient for holding said pivoting door at said half-open position.

4. A control device as claimed in claim 1, in which said control unit comprises:

a first section that engages said electric clutch and energizes the motor to run in a door opening direction when said door operation switch issues a door opening signal;

a second section that keeps the running of said motor when said door operation switch issues no signal within a given period from the time when said door operation switch issues the door opening signal; and a third section that disengages said electric clutch and de-energizes the motor when said pivoting door reaches a full-open position.

5. In a motor vehicle having a pivoting door that pivots upward and downward, a control device for controlling said pivoting door, comprising:

an electric drive unit for pivoting said pivoting door by an electric power;

a door operation switch that permits the pivoting door to pivot between a full-close position and a full-open position with the aid of said electric drive unit when operated;

a movement stopping means that stops and holds the pivoting door at a half-open position when operated; and a control unit for controlling said electric drive unit and said movement stopping means in accordance with an ON/OFF operation of said door operation switch;

in which said control unit is constructed to control said electric drive unit and said movement stopping means in accordance with the number of times said door operation switch is manually operated in a given period, and in which said control unit is constructed to energize said electric drive unit upon sensing a first ON operation of said door operation switch and de-energize said electric drive unit and operate said movement stopping means upon sensing a second ON operation of said door operation switch.

6. A control device as claimed in claim 5, in which said control unit is constructed to stop said electric drive unit and operate said movement stopping means when said door operation switch is turned ON during operation of said electric drive unit.

7. A control device as claimed in claim 6, in which said door operation switch comprises a door open switch and a door close switch, in which said control unit is arranged to energize said electric drive unit to run in a direction to open said pivoting door when said door open switch is turned ON, to energize said electric drive unit to run in a direction to close said pivoting door when said door close switch is turned ON and to de-energize said electric drive unit and operate said movement stopping means thereby to stop and hold the pivoting door at a half-open position when one of said door open and close switches is turned ON during operation of said electric drive unit.

8. A control device as claimed in claim 7, in which said door open and close switches are mounted on either one of said pivoting door, the vehicle body and a remote controller.

9. A control device as claimed in claim 8, in which said electric drive unit comprises:

a reversible electric motor;

a speed reduction gear having an input part connected to an output part of said motor;

an opening/closing mechanism that converts a power of an output part of said speed reduction gear to the pivoting movement of said pivoting door; and an electric clutch operatively disposed in a power transmission path that extends from said motor to said opening/closing mechanism, said electric clutch having both an engaged condition wherein said power transmission path is established and a disengaged condition wherein said power transmission path is broken.

10. A control device as claimed in claim 9, in which said power transmission path constitutes said movement stopping means when said electric motor is de-energized and said electric clutch assumes said engaged condition.

11. In a motor vehicle having a pivoting door that pivots upward and downward, a control device for controlling said pivoting door, comprising:

- an electric drive unit for pivoting said pivoting door by an electric power;
- a door operation switch that permits the pivoting door to pivot between a full-close position and a full-open position with the aid of said electric drive unit when operated;
- a movement stopping means that stops and holds the pivoting door at a half-open position when operated in which said movement stopping means is arranged to produce a braking force when said pivoting door is pivoted manually, said braking force being sufficient for holding said pivoting door at said half-open position;
- a control unit for controlling said electric drive unit and said movement stopping means in accordance with an ON/OFF operation of said door operation switch; and
- a door sensor that detects a moved distance of the pivoting door from a previous half-open position and the moving direction of the pivoting door, and in which said control unit is arranged to energize said electric drive unit to run in a direction to open said pivoting door when said door sensor detects that the pivoting door is pivoted by a predetermined small degree in the door opening direction from the previous half-open position, and to energize said electric drive unit to run in a direction to close said pivoting door when said door sensor detects that the pivoting door is pivoted by a predetermined small degree in the door closing direction from the previous half-open position.

12. A control device as claimed in claim 11, in which said electric drive unit comprises a reversible electric motor; a speed reduction gear having an input part connected to an output part of said motor; and an opening/closing mechanism that converts a power of an output part of said speed reduction gear to the pivoting movement of the pivoting door, and in which said movement stopping means comprises a power transmission path that extends from said motor to said opening/closing mechanism, and in which said movement stopping means becomes operative when said motor is de-energized and the pivoting door is manually pivoted.

13. A control device as claimed in claim 11, in which said electric drive unit comprises:

- a reversible electric motor;
- a speed reduction gear having an input part connected to an output part of said motor;
- an opening/closing mechanism that converts a power of an output part of said speed reduction gear to the pivoting movement of the pivoting door; and
- an electric clutch operatively disposed in a power transmission path that extends from said motor to said opening/closing mechanism, said electric clutch having an engaged condition wherein said power transmission path is fully established, a disengaged condition wherein said power transmission path is fully broken and a half-engaged condition wherein said power transmission path is partially established.

14. A control device as claimed in claim 13, in which said power transmission path constitutes said movement stopping means when said electric motor is de-energized and said electric clutch assumes said half-engaged condition.

15. In a motor vehicle having a pivoting door that pivots upward and downward, a control device for controlling said pivoting door, comprising:

- an electric drive unit for pivoting said pivoting door by an electric power;
- a door operation switch that permits the pivoting door to pivot between a full-close position and a full-open position with the aid of said electric drive unit when operated;
- a movement stopping means that stops and holds the pivoting door at a half-open position when operated; and
- a control unit for controlling said electric drive unit and said movement stopping means in accordance with an ON/OFF operation of said door operation switch;
- in which said electric drive unit comprises:
  - a reversible electric motor;
  - a speed reduction gear having an input part connected to an output part of said motor;
  - an opening/closing mechanism that converts a power of the output part of said speed reduction gear to the pivoting movement of the pivoting door; and
  - an electric clutch operatively disposed in a power transmission path that extends from said motor to said opening/closing mechanism, said electric clutch having both an engaged condition wherein said power transmission path is established and a disengaged condition wherein said power transmission path is broken;
  - in which said power transmission path constitutes said movement stopping means when said electric motor is de-energized and said electric clutch assumes said engaged condition;
  - in which said control unit comprises:
    - a first section that engages said electric clutch and energizes the motor to run in a door opening direction when said door operation switch issues a door opening signal;
    - a second section that keeps the running of said motor when said door operation switch issues no signal within a given period from the time when said door operation switch issues the door opening signal;
    - a third section that disengages said electric clutch and de-energizes the motor when said pivoting door reaches a full-open position;
    - a fourth section that de-energizes said motor and operates said movement stopping means thereby to stop and hold said pivoting door at a half-open position when said door operation switch issues a door stopping signal within said given period;
    - a fifth section that energizes said motor to run in a door closing direction when, with said pivoting door being in said half-open position, said door operation switch issues a door closing signal;
    - a sixth section that keeps the running of said motor when said door operation switch issues no signal within a given period from the time when said door operation switch issues said door closing signal; and a seventh section that disengages said electric clutch and de-energizes said motor when said pivoting door reaches a full-close position.

16. A control device as claimed in claim 15, in which said control unit further comprises:

an eighth section that senses a manual pivoting of the pivoting door;

a ninth section that judges whether said door operation switch issues a door opening/closing signal or not; and a tenth section that engages said electric clutch and energizes the motor to run in a door opening/closing direction when said ninth section judges that the door operation switch issues the door opening/closing signal.

17. In a motor vehicle having a pivoting door that pivots upward and downward, a control device for controlling said pivoting door, comprising:

an electric drive unit for pivoting said pivoting door by an electric power;

a door operation switch that permits the pivoting door to pivot between a full-close position and a full-open position with the aid of said electric drive unit when operated;

a movement stopping means that stops and holds the pivoting door at a half-open position when operated; and a control unit for controlling said electric drive unit and said movement stopping means in accordance with an ON/OFF operation of said door operation switch;

in which said electric drive unit comprises:

a reversible electric motor;

a speed reduction gear having an input part connected to an output part of said motor;

an opening/closing mechanism that converts a power of the output part of said speed reduction gear to the pivoting movement of the pivoting door; and an electric clutch operatively disposed in a power transmission path that extends from said motor to said opening/closing mechanism, said electric clutch having both an engaged condition wherein said power transmission path is established and a disengaged condition wherein said power transmission path is broken;

in which said power transmission path constitutes said movement stopping means when said electric motor is de-energized and said electric clutch assumes said engaged condition;

in which said control unit comprises:

a first section that engages said electric clutch and energizes the motor to run in a door opening direction when said door operation switch issues a door opening signal;

a second section that keeps the running of said motor when said door operation switch issues no signal within a given period from the time when said door operation switch issues the door opening signal;

a third section that disengages said electric clutch and de-energizes the motor when said pivoting door reaches a full-open position;

a fourth section that de-energizes said motor, causes said electric clutch to assume its half-engaged condition and operates said movement stopping means thereby to stop and hold said pivoting door at a half-open position when said door operation switch issues a door stopping signal within said given period.

18. A control device as claimed in claim 17, in which said control unit further comprises:

a fifth section that fully engages said electric clutch and energizes said motor to run in a door closing direction when said pivoting door is pivoted manually in a closing direction by a predetermined small angle; and a sixth section that fully disengages said electric clutch and de-energizes said motor when said pivoting door reaches a full-close position.

19. A control device as claimed in claim 17, in which said control unit further comprises:

a seventh section that fully engages said electric clutch and energizes said motor to run in a door opening direction when said pivoting door is pivoted manually in an opening direction by a predetermined small angle; and a fifth section that fully disengages said electric clutch and de-energizes said motor when said pivoting door reaches a full-open position.

* * * * *